3,256,304
POLYMERIC FAT ACIDS AND PROCESS FOR MAKING THEM

Eugene M. Fischer, St. Paul, and Frances M. Linn, Minneapolis, Minn., assignors to General Mills, Inc., a corporation of Delaware
No Drawing. Filed Mar. 1, 1962, Ser. No. 176,800
7 Claims. (Cl. 260—407)

This invention relates to polymeric fat acids having a light color and to light colored polyamides thereof, and in particular, to polymeric fat acids having a Gardner color less than 1, a photometric color as described hereinbelow of at least 90%, and polyamides therefrom having a Gardner color less than 5.

Polymeric fat acids are well known and commercially available. In general, colors of such products are in the range of Gardner colors of about 9–11. Some polymeric fat acids have improved colors in the range of Gardner color of 6. When derivatives of the polymeric fat acids are made, the colors tend to increase, providing products undesirable for many applications. The polymeric fat acids are used in the formation of many types of polymers such as polyesters, polyamides, ester-based urethanes and epoxy resins. These derivatives find application in adhesives, coatings, castings, laminates can sealants, inks, and the like. Particularly in applications such as coatings and inks, color poses a problem.

It has now been discovered that polymeric fat acids having very light colors may be provided, such color being substantially water white, having a Gardner color less than 1. When used to form derivatives, the final products possess light colors on the order of Gardner 1–5, which in many instances is lower than the starting colors of the presently available polymeric fat acids.

Briefly, the invention consists in preparing polymeric fat acids having a Gardner color less than 1, and polyamide derivatives thereof, by a process generally involving hydrogenation and distillation of presently available polymeric fat acids having a Gardner color greater than 1 and usually in the range of a Gardner color of 6–11. In such process, an unexpected decrease in color is obtained. In addition, the products possess excellent color stability properties. The improvement does not appear to be based on the decrease of iodine value due to the hydrogenation. The light colors are generally obtained by conducting the hydrogenation to a point where the iodine value is reduced approximately 20–30 units below the original iodine value of the starting polymeric fat acids to substantially complete hydrogenation, for example, iodine values of about 5. The distillation may be conducted prior or subsequent to the hydrogenation.

Polyamides having a Gardner color less than 5, and preferably 2 or lower, may be prepared by reaction of the polymeric fat acids having a Gardner color less than 1 with alkylene polyamines under the usual amidification conditions. In many instances, the polyamide product will have a Gardner color less than 1. In addition to possessing light color, these polyamides have excellent blocking resistance. The polyamides also find utility in the curing of epoxy resins.

It is therefore an object of this invention to provide light color polymeric fat acids, in particular, having a photometric color not less than 90%.

It is also an object of this invention to provide light colored polymeric fat acids having good color stability.

Another object of this invention is to provide light colored polyamide derivatives of the polymeric fat acids.

Other objects and advantages will be apparent from the following description.

The starting materials for the present invention are the polymeric fat acids. These are well known and commercially available. The term "polymeric fat acid," as used herein, refers to a polymerized fat acid either dimeric, trimeric, or higher polymeric forms and thus includes the polymerized mixture of acids which usually contains a predominant portion of dimer acids, a small quantity of trimer and higher polymeric forms, and some residual monomer. As used herein, "trimer" will also include the higher polymeric forms. The term "fat acid," as used herein, refers to the naturally occurring and synthetic monobasic aliphatic acids having hydrocarbon chains of 8–24 carbon atoms. The term "fat acids" therefore includes saturated, ethylenically unsaturated, and acetylenically unsaturated acids.

Sources of the naturally occurring fat acids are those found in fats and oils, such as the drying or semi-drying oils. The polymeric fat acids thus result from the polymerization of drying or semi-drying oils or the free acids thereof or the simple aliphatic alcohol esters of such acids such as the methyl esters or other alkyl esters in which the allkyl group has from 1 to 8 carbon atoms. Suitable drying or semi-drying oils include soybean, linseed, tung, perilla, oiticica, cottonseed, corn, sunflower, safflower, dehydrated castor oil, and the like. Suitable fatty acids may also be obtained from tall oil, soap stock, and other similar materials. In the polymerization process the fat acids combine to provide a mixture of dimeric and higher polymeric forms generally referred to as dimer, trimer, and so forth.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxide catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride, and other Lewis acids, anthraquinone, sulfur dioxide, and the like. Suitable monomers include the branched straight chain poly- and mono-ethylenically unsaturated acids such as 3-octanoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, eicosatetraenoic acid, nisinic acid, scoliodonic acid, and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both monounsaturated and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids. At the present time, the most readily available naturally occurring unsaturated acid available in large quantities is linoleic acid. Accordingly, it should be appreciated that polymeric fat acids will, as a practical matter, result from fat acid mixtures that contain a preponderance of linoleic acid. These mixtures will also generally contain some oleic, linolenic, palmitoleic, and the like. It should also be appreciated that since linoleic acid occurs in nature as a complex mixture in every instance, it is available in various degrees of purity ranging from relatively expensive pure linoleic acid that has been laboriously purified to crude sources such as tall oil and soap stock which contains substances other than fatty acids.

As stated previously, the light colored, stable products of the present invention are obtained by hydrogenating and distilling the above described polymeric fat acids or the alkyl esters thereof. These products have Gardner colors less than 1 and an iodine value at least 20 units below the original iodine value of the starting material.

Gardner colors of less than 1, the lowest color on the Gardner standard, have been mentioned. Since it is possible by means of the present invention to obtain colors below a Gardner color of 1, a different means of measuring color must be used to show relative color values below this point. Photometric methods of measuring color are one means which may be employed. One such method involves the use of a Coleman, Jr., Model 6A Spectrophotometer calibrated to give the following readings of a standard nickel sulfate solution:

| Millimicrons: | Transmittance |
|---|---|
| 400 | Less than 4.0%. |
| 460 | 26.2±2.0. |
| 510 | 73.9±1.0. |
| 550 | 54.8±1.0. |
| 620 | 5.2±0.5. |
| 670 | 1.1±0.5. |
| 700 | Less than 2.0. |

The instrument is calibrated using a standard nickel sulfate solution which may be purchased in a 25 ml. cuvette. This standard solution may be prepared by dissolving 200 grams of $NiSO_4$, $6H_2O$, AR, and diluting to exactly 1000 ml. in a volumetric flask at a temperature between 25–30° C. The nickel content of the solution should be between 4.40 and 4.46 grams of nickel per 100 ml. After calibration the transmittance is read on a 25 ml. sample in a cuvette at 10–20° C. at 5 wavelengths from 400–500 millimicrons using a 25 ml. cuvette of distilled water for adjusting transmission to 100% at each wavelength. The average of these 5 values is the photometric color as follows:

$$\text{Photometeric color} = \frac{T_{400} + T_{425} + T_{450} + T_{475} + T_{500}}{5}$$

where T is percent transmission.

Unless otherwise indicated, the photometric color stated herein was determined by the above described method. For purposes of comparison and as a guide, the following is a comparison of Gardner color and the above described photometric color on various samples.

| Gardner color: | Photometric color |
|---|---|
| 6–7 | percent__ 24.2 |
| 2 | 56.7 |
| 1–2 | 63.4 |
| 1–2 | 65.8 |
| 1+ | 68.5 |
| 1+ | 69.8 |
| 1+ | 71.3 |
| 1 | percent__ 78.3 |
| Less than 1 | 80.5 |

With regard to the foregoing correlation, it should be remembered that Gardner color is a visual comparison of the sample color with the standard and is not therefore a precise measurement. This is especially true in the range of Gardner 1. Thus, a Gardner color of 1 will correspond approximately to a photometric color of 78–79%.

The percent monomer, dimer and trimer is determined by a micro method described in J.A.O.C.S., Paschke, R.F., Kerns, J.R. and Wheeler, D.H., vol. 31, pages 5–7, (1954), using a micromolecular still and a quartz helix. The iodine value is the centigrams of iodine absorbed per gram of sample and is determined by a rapid Wijs method using chloroform as the sample solvent in place of carbon tetrachloride and a sample size of 0.250 gram or less.

The starting materials in the present invention are the commercially available polymeric fat acids which generally contain in excess of 13% trimer, up to about 85% dimer with some monomer, generally less than 13%. These are generally obtained by polymerization of the unsaturated fatty acids in the presence of from 1–25% of a clay, either a naturally occurring clay having an alkaline or acid pH or an acid activated clay. The polymerization is generally conducted under pressure at a temperature in the range of 180–260° C. for about 4–6 hours followed by stripping. These products generally have a Gardner color of from 6–10.

In the hydrogenation step, the iodine value of the original polymeric fat acid decreases. In addition to reducing the unsaturation, the hydrogenation appears to have a bleaching effect causing a decrease in color. The hydrogenation is accomplished using hydrogen under pressure in the presence of a hydrogenation catalyst. In general, from ½ to 6 hours is employed, however, the time will vary depending on the catalyst concentration, temperature and pressure.

The catalysts generally employed are Ni, Co, Pl, Pd, Rh and other members of the platinum family. In general, the catalyst is suspended on an inert carrier such as kieselguhr, commonly used with Ni, and carbon, commonly used with the platinum family of catalysts. With palladium, the catalyst employed to illustrate the invention consisted of 5% palladium on carbon. With such catalyst, concentrations are employed of from 0.1 to 5% by weight based on the polymeric fat acids being hydrogenated generally 1–2% being used where low iodine values are desired and no reuse of catalyst is employed. In general, higher concentrations are economically unattractive.

When using 2% of the 5% palladium on carbon as the catalyst and 1000 p.s.i. pressure, the preferred temperature range is about 175–225° C. Lower temperature, for example, about 100° C., may be employed with higher catalyst concentration and longer time. Higher temperatures, for example, about 300° C., may be used with lower catalyst concentration.

When using 2% of the 5% palladium on carbon as the catalyst at about 210–215° C., the pressure employed is about 1000 p.s.i. although generally 900–1100 p.s.i. will provide satisfactory results. Higher and lower pressures may, however, be employed with differing temperatures and catalyst concentrations. In general, higher pressures give better hydrogenation.

The distillation may be conducted prior or subsequent to the hydrogenation. The distillation products are divided into three fractions or cuts, a fore-cut, a center cut and a residue. The residue, consisting predominantly of the trimeric and highly polymeric forms, consists of from 10–35%, and generally about 20%, of the material being distilled. The center-cut, representing the products of this invention, is the cut consisting of the next 35 to 90% of the material, the remainder being the fore-cut. As is apparent, it may not be necessary to take any forecut whatever. When taken, the forecut in general need not exceed 40% of the product being distilled. Generally, a fore-cut of from 15–25% is employed where such a cut is taken.

For the purpose of illustrating the invention, polymeric fat acids from a mixture of tall oil fatty acids will be used. While polymeric fat acids, or the alkyl esters thereof, from other sources differ slightly in properties, the invention is applicable thereto and it is understood that the invention is not to be limited to the particular polymeric fat acids used in the following examples for illustration of the invention.

The tall oil fatty acids used to prepare the polymeric fat acids employed as starting material to illustrate the present invention are available commercially and sold under the name Pamak I. These acids had the following typical analysis:

Acid No. (A.V.) _____ 192.0
Saponification No. (S.V.) _____ 196.7
Percent unsaponifiable _____ 1.5
Iodine No. (I.V.) _____ 133.4
Gardner color _____ 4–5

These acids were polymerized at a temperature of about 230° C. for about 5 hours under pressure due to the presence of volatiles, such as water originally present in the acids or clay, in the presence of about 10% of a naturally occurring alkaline clay having a pH of about 7.6. This is a crystalline montmorillonite bentonite clay. The volatiles were vented and the batch cooled to 150° C. The clay is then filtered from the reaction mixture and stripped to provide polymeric fat acids having the following properties:

A.V. _____ 188.5
S.V. _____ 198.8
I.V. _____ 119.4
Percent monomer (M) _____ 12.6
Percent dimer (D) _____ 72.0
Percent trimer (T) _____ 15.4
Gardner color _____ 7–8

*Example I*

The polymeric fat acids described above were then hydrogenated, using hydrogen, at a temperature of 215° C., a pressure of 950 p.s.i. for 5 hours in the presence of 2% by weight based on the polymeric fat acids of a catalyst consisting of 5% palladium on carbon. The hydrogenated product had the following properties:

A.V. _____ 183.5
S.V. _____ 192.1
I.V. _____ 8.1
Photometric color _____ percent__ 80.5

This product was then distilled taking cuts as follows:

(A) a 20% forecut, 55% center cut and 25% residue
(B) a 25% forecut, 61% center cut and 14% residue The various center cuts had the following analyses:

|  | A | B |
|---|---|---|
| A.V. | 193.3 | 191.8 |
| S.V. | 199.4 | 198.4 |
| I.V. | 9.1 | 7.7 |
| Percent M | 2.1 | 0.7 |
| Percent D | 96.3 | 92.8 |
| Percent T | 1.6 | 6.5 |
| Photometric Color, Percent | 95.9 | 93.6 |

The color stability of these products was studied by storing samples thereof at 50° C. under nitrogen and periodically checking the color. The results were as follows:

|  | Gardner Color | |
|---|---|---|
|  | A | B |
| 8 days | <1 | <1 |
| 14 days | [1] <1 | [2] <1 |

[1] Photometric Color 88.3%.
[2] Photometric Color 79.7%.

*Example II*

In the same manner, several samples of similar polymeric fat acids were hydrogenated and distilled, the hydrogenation being conducted to a lesser degree. The results of these are as follows:

|  | C | D |
|---|---|---|
| Amount of Hydrogenation Catalyst, Percent | .2 | .1 |
| Hydrogenated Product: | | |
| A.V. | 186.1 | 187.1 |
| S.V. | 197.6 | 195.7 |
| I.V. | 68.6 | 66.5 |
| Color (Initial), Percent | 75.8 | 66.8 |
| (After 28 days), Percent | 76.4 | 66.9 |
| (After 63 days), Percent | 69.4 | 61.1 |
| Hydrogenated and Distilled Product [1]: | | |
| A.V. | 191.5 | 190.8 |
| S.V. | 198.4 | 197.2 |
| I.V. | 76.5 | 77.0 |
| Percent M | 1.1 | 1.4 |
| Percent D | 97.5 | 97.6 |
| Percent T | 1.4 | 1.0 |
| Color (Initial), Percent | 91.8 | 93.7 |
| (After 28 days), Percent | 92.2 | 93.9 |
| (After 49 days), Percent | 88.4 | 88.9 |

[1] Center cut—In C, a 36% forecut and 39% center cut was taken with a 25% residue. In D, a 28% forecut and 40% center cut was taken with a 32% residue.

Several other hydrogenated and distilled products were prepared which products had the following properties.

| Sample | IV | Initial Color, Percent | Color Stability [1] | | |
|---|---|---|---|---|---|
|  |  |  | Color at Start of Test Percent | Color After 39 days, Percent | Color After 72 days, Percent |
| 1 | 7.9 | 97.5 | 94.1 | 94.2 | 96.0 |
| 2 | 8.4 | 94.9 | 93.8 | 92.8 | 94.3 |
| 3 | 23.1 | 97.8 | 95.9 | 95.6 | 97.2 |
| 4 | 30.6 | 98.3 | 96.7 | 96.2 | 97.4 |
| 5 | 38.7 | 97.7 | 93.5 | 92.6 | 93.5 |
| 6 | 37.6 | 96.9 | 96.7 | 97.6 | 96.8 |
| 7 | 53.0 | 98.3 | 97.1 | 97.0 | 97.1 |
| 8 | 51.0 | 97.9 | 97.2 | 96.3 | 96.5 |

[1] Storage test in glass bottles at room temperature; test initiated about 10 days after preparation.

It is thus apparent from the foregoing that an unexpected improvement in color is shown in the products which possess good color stability and such improvement is not dependent on the iodine value of the product.

As stated previously, these light colored polymeric fat acids generally having a dimer content in excess of 85% and usually in excess of 90% are useful in preparing polyamide resins. These polyamides are prepared by reaction of the polymeric fat acids and polyamines under the usual conditions employed for this purpose. These conditions are reacted at about 100–250° C. for about 2–4 hours and generally about 200° C. for 3 hours. If imidazoline linkages are also desired, higher temperatures up to 325° C. are employed with the higher polyamines such as diethylene triamine, triethylene tetramine and tetraethylene pentamine, generally about 285–315° C. for about 3 hours. Such a product will possess approximately two imidazoline groups for every amide group. In either event, the higher polyamines will react with the polymeric fat acids to form a random mixture of branched and linear type linkages.

The polyamines which may be employed for reaction with the polymeric fat acids have the formula $$H_2NR(NHR)_xNH_2$$

where R is an aliphatic or aromatic hydrocarbon radical and $x$ is an integer from 0 to 6. Illustrative of the aliphatic hydrocarbon radical polyamines are the alkylene polyamines such as ethylene diamine, diethylene triamine, triethylene tetramine, tetraethylene pentamine and the corresponding other algylene polyamines having the formula $H_2NR'(NHR')_nNH_2$ where R' is an alkylene radical having from 1 to 6 carbon atoms and $n$ is an integer from 0 to 6. Thus, while the alkylene radical is generally ethylene, it should not be limited thereto as the propylene, butylene and the like derivatives may also be employed. Illustrative of the arylene compounds are the phenylene diamines, o-, m-, and p-, and methylene dianiline. Illustrative of another polyamine is m-xylylene diamine which behaves like an aliphatic polyamine though having an aromatic nucleus. In such case, the amino nitrogens are attached indirectly to the ring through a carbon atom, thus accounting for behavior as an aliphatic polyamine.

The polyamide resins will have amine numbers up to about 400, the substantially neutral polyamides with amine numbers approaching zero being suitable for use as adhesives in themselves while the higher amine number products, amine numbers in excess of about 50, are suitable as curing agents for epoxy resins. As used herein, the "amine number" of the polyamide resin is the number of milligrams of KOH equivalent to the free amine groups in one gram of resin.

*Example III*

Polyamides were prepared by reaction of the polymeric fat acids with the polyamine at 205° C. for 3 hours. After the 3 hour reaction period, vacuum was applied and heating continued for 1 hour. The polyamide was then cooled. Polyamides were prepared from both the hydrogenated and undistilled acids and from the hydrogenated and distilled polymeric fat acids, the distilled acids correspond to sample A previously described. The polyamine employed was diethylene triamine, the ratio of amine equivalents per carboxyl equivalents being 1.5. The polyamide X from the hydrogenated and distilled polymeric fat acids had an amine number of 95.8, a viscosity of 10.0 poises at 150° C., and a Gardner color less than 1. The polyamide Y from the hydrogenated undistilled acids had an amine number of 85.8, a viscosity of 14.9 poises at 150° C., and a Gardner color 2–3.

Similarly, several polyamides were prepared from the following hydrogenated and distilled acids:

| Sample | Percent M | Percent T | IV | S.V. | A.V. |
|---|---|---|---|---|---|
| 1 | 0.3 | 0.2 | 8.4 | 198 | 193 |
| 2 | 0.3 | 0.2 | 8.4 | 198 | 193 |
| 3 | 0.3 | 0.2 | 8.4 | 198 | 193 |
| 4 | 0.3 | 0.2 | 8.4 | 198 | 193 |
| 5 | 0.8 | 0.5 | 7.9 | 198 | 193 |
| 6 | 1.3 | 0.4 | 23.1 | 198 | 193 |
| 7 | 1.0 | 2.1 | 30.6 | 198 | 193 |

Substantially neutral polyamides (low amine number) were prepared from hexamethylene diamine (HMDA) and diaminopentane (DAP) as shown by the following table

| | Reactants | | | Products | | | | | |
|---|---|---|---|---|---|---|---|---|---|
| Diamine | Amt. of Diamine, grams | Acid Sample | Amount of Acid, grams | Amine No. | Acid No. | Ball and Ring Melting Point, °C. | Inherent Viscosity [1] | Tensile Strength, p.s.i. | Percent Elongation |
| HMDA | 87.15 | 1 | 432 | 0.9 | 2.7 | 96.6 | 0.37 | 2,700 | 500 |
| HMDA | 87.15 | 2 | 432 | 1.4 | 2.6 | 95.6 | 0.38 | 2,200 | 550 |
| DAP | 76.64 | 3 | 430.5 | 1.3 | 2.7 | 97.1 | 0.34 | 1,350 | 650 |
| DAP | 66.12 | 4 | 427.5 | 1.5 | 2.5 | 107 | 0.31 | 1,200 | 0 |
| HMDA | 87.25 | 5 | 430 | 1.5 | 1.7 | 111 | 0.45 | 3,700 | 600 |
| HMDA | 87.20 | 6 | 431 | 0.5 | 1.5 | 98 | 0.43 | 3,400 | 600 |
| HMDA | 87.20 | 7 | 430.5 | 0.3 | 2.3 | 114 | 0.54 | 4,300 | 575 |

[1] 1% in meta-cresol.

The embodiments of the invention in which an exclusive property or privilege is claimed are defined as follows:

1. A clay polymerized and hydrogenated monocarboxylic aliphatic acid having a hydrocarbon chain of 8 to 24 carbon atoms and having a photometric color not less than 90%.

2. A process of preparing polymeric fat acids having a photometric color not less than 90% comprising hydrogenating and distilling a polymeric compound selected from the group consisting of a clay polymerized monocarboxylic aliphatic acid having a hydrocarbon chain of 8 to 24 carbon atoms and the alkyl esters thereof in which the alkyl group has from 1 to 8 carbon atoms, said polymeric compound having a Gardner color more than 1 in which said hydrogenation is conducted at a temperature in the range of about 175–225° C. at a pressure within the range of 900–1100 p.s.i. in the presence of from about 0.1 to 5% by weight, based on the amount of polymeric fat compound employed, of a hydrogenation catalyst.

3. A hydrogenated and distilled polymeric fat acid having a photometric color not less than 90% prepared by the process of claim 2.

4. A process as defined in claim 2 in which said distillation is conducted prior to said hydrogenation.

5. A process as defined in claim 2 in which said distillation is conducted subsequent to said hydrogenation.

6. A process as defined in claim 2 in which said hydrogenation catalyst is selected from the group consisting of Ni, Co, Pl, Pd, and Rh.

7. A process as defined in claim 2 in which said temperature is 215° C., said pressure is 1000 p.s.i., and said catalyst is 5% Pd, by weight, on carbon and is employed in the amount of about 2% by weight.

References Cited by the Examiner
UNITED STATES PATENTS

| | | | |
|---|---|---|---|
| 1,178,142 | 4/1916 | Ellis | 260—407X |
| 2,260,417 | 10/1941 | Whiteley et al. | 260—407 X |
| 2,373,015 | 4/1945 | Cowan et al. | 260—407 X |
| 2,536,568 | 1/1951 | Pollack | 260—407 |
| 2,558,494 | 6/1951 | Meerburg | 260—407 |
| 2,581,413 | 1/1952 | Hillyer et al. | 260—407 |
| 2,599,451 | 6/1952 | Hickman et al. | 260—407 |
| 2,750,366 | 6/1956 | Turinsky | 260—404.5 X |
| 2,764,601 | 9/1956 | Garceau | 260—404.5 |
| 2,768,090 | 10/1956 | Wittcoff et al. | 260—404.5 X |
| 2,933,517 | 4/1960 | Greenlee | 260—404.5 |
| 2,944,071 | 7/1960 | Pessolano et al. | 260—404.5 |
| 3,036,099 | 5/1962 | Barrett et al. | 260—407 X |

CHARLES B. PARKER, *Primary Examiner.*

JOSEPH P. BRUST, ANTON H. SUTTO,
*Assistant Examiners.*